(12) United States Patent
Wu et al.

(10) Patent No.: US 11,689,678 B2
(45) Date of Patent: Jun. 27, 2023

(54) DOUBLE-SIDED SYNCHRONOUS SCANNING DEVICE AND DOUBLE-SIDED SYNCHRONOUS SCANNER

(71) Applicant: ANHUI GAOZHE INFORMATION TECHNOLOGY CO., LTD, Anhui (CN)

(72) Inventors: Yong Wu, Anhui (CN); Jinwang Zhou, Anhui (CN); Lizhen Yang, Anhui (CN)

(73) Assignee: ANHUI GAOZHE INFORMATION TECHNOLOGY CO., LTD, Hefei (CN)

( * ) Notice: Subject to any disclaimer, the term of this patent is extended or adjusted under 35 U.S.C. 154(b) by 0 days.

(21) Appl. No.: 17/483,147

(22) Filed: Sep. 23, 2021

(65) Prior Publication Data

US 2022/0014642 A1    Jan. 13, 2022

Related U.S. Application Data

(63) Continuation of application No. PCT/CN2021/108011, filed on Jul. 22, 2021.

(30) Foreign Application Priority Data

Jul. 6, 2021    (CN) .......................... 202110764412.2

(51) Int. Cl.
  *H04N 1/10*    (2006.01)
  *H04N 1/028*   (2006.01)
(52) U.S. Cl.
  CPC ......... *H04N 1/1013* (2013.01); *H04N 1/0282* (2013.01)

(58) Field of Classification Search
  CPC ... H04N 21/234363; H04N 21/234372; H04N 21/234381; H04N 21/23439;
  (Continued)

(56) References Cited

U.S. PATENT DOCUMENTS 7,697,115 B2 * 4/2010 del Puerto .......... G03F 7/70425
                                                    355/53
8,610,907 B2 * 12/2013 You ...................... H04N 1/0035
                                                    358/1.18

(Continued)

FOREIGN PATENT DOCUMENTS

CN    112188027 A    1/2021
KR    20100067422 A  6/2010

*Primary Examiner* — Negussie Worku

(57) ABSTRACT

The present invention discloses a double-sided synchronous scanning device. A scanning channel is formed between two scanning components; two backlight plates are respectively used to provide backlight for an opposite-side scanning component and fixed with the same-side scanning component; one side of each backlight plate facing the scanning channel is provided with a light guide groove corresponding to a light inlet of the corresponding scanning component; a backlight source is arranged in the light guide groove. When the two scanning components work synchronously, because the backlight plates always need to provide backlight for the opposite-side scanning component, and the reflected light generated by the backlight plates on a scanned sample enters the light inlet of the same-side scanning component, which will affect the image scanning effect.

20 Claims, 6 Drawing Sheets

(58) Field of Classification Search
CPC ......... H04N 21/26258; H04N 21/2662; H04N 21/6125; H04N 21/6379; H04N 21/8456; H04N 13/264; H04N 17/02; H04N 5/142; H04N 5/145; H04N 7/012; H04N 7/014; H04N 7/0142; H04N 9/73; H04N 9/735; H04N 1/0282; H04N 1/1013; H04N 13/204; H04N 5/63; H04N 7/14; F21V 29/74; F21V 17/02; F21V 19/0055; F21V 23/002; F21V 29/713; F21V 29/75; F21V 29/76; F21V 33/0084; F21V 7/0083; F21V 29/763; F21V 29/773; F21V 29/89; F21V 3/00
USPC .......................................................... 358/474
See application file for complete search history.

(56) References Cited

U.S. PATENT DOCUMENTS

| | | | | |
|---|---|---|---|---|
| 2002/0184821 | A1* | 12/2002 | Campeau | A47G 7/08 47/72 |
| 2003/0053148 | A1* | 3/2003 | Matsumoto | H04N 1/0318 358/474 |
| 2007/0091383 | A1* | 4/2007 | Crutchfield | H04N 1/047 358/474 |
| 2008/0069585 | A1 | 3/2008 | Amada | |
| 2010/0187975 | A1* | 7/2010 | Tsukahara | G02F 1/1336 313/503 |
| 2010/0309528 | A1* | 12/2010 | Nacman | H04N 1/40 358/444 |
| 2012/0155114 | A1* | 6/2012 | Kim | G02B 6/0033 362/617 |
| 2012/0162729 | A1* | 6/2012 | Kurakata | H04N 1/00716 358/448 |
| 2012/0170083 | A1* | 7/2012 | Joh | H04N 1/00031 358/475 |
| 2013/0114020 | A1* | 5/2013 | Cho | G02F 1/133615 349/62 |
| 2013/0182298 | A1* | 7/2013 | Tu | H04N 1/2032 358/498 |
| 2013/0182456 | A1 | 7/2013 | Chin | |
| 2013/0265620 | A1* | 10/2013 | Matsumoto | H04N 1/00615 271/264 |
| 2017/0092197 | A1* | 3/2017 | Fujimura | G09G 3/3258 |
| 2018/0152583 | A1* | 5/2018 | Sugiyama | H04N 1/0312 |
| 2018/0259702 | A1* | 9/2018 | Den Breejen | G02B 6/0091 |
| 2022/0014642 | A1* | 1/2022 | Wu | H04N 1/1013 |

* cited by examiner

DOUBLE-SIDED SYNCHRONOUS SCANNING DEVICE AND DOUBLE-SIDED SYNCHRONOUS SCANNER

CROSS-REFERENCE TO RELATED APPLICATIONS

This application is a continuation of International Application No. PCT/CN2021/108011, filed on Jul. 22, 2021, which claims the benefit of priority from Chinese Patent Application No. 202110764412.2, filed on Jul. 6, 2021. The content of the aforementioned applications, including any intervening amendments thereto, are incorporated herein by reference.

TECHNICAL FIELD

The present invention relates to the technical field of double-sided synchronous scanning devices, in particular to a double-sided synchronous scanning device and a double-sided synchronous scanner.

BACKGROUND OF THE PRESENT INVENTION

At present, when a double-sided scanner scans a double-sided image of a sample, a scanning head is usually moved along a preset path, and completes the scanning work in a moving process. In order to ensure the scanning effect, a backlight plate is usually arranged for each scanner on the opposite side. On the one hand, the foreground scanning head interferes with the effect of the backlight. On the other hand, because the distance between the backlight plate and the opposite-side scanning head is large, the brightness of the light source is insufficient. When the scanning head moves relative to the backlight plate for scanning, the image backlight is uneven.

SUMMARY OF THE PRESENT INVENTION

In order to solve the technical problems existing in the background, the present invention proposes a double-sided synchronous scanning device and a double-sided synchronous scanner.

The present invention proposes a double-sided synchronous scanning device, which comprises two scanning components and two backlight plates.

A scanning channel is formed between the two scanning components; the two scanning components are staggered; the two backlight plates are respectively located on both sides of the scanning channel and fixedly arranged with the same-side scanning component; the two scanning components are staggered along a moving direction; and each backlight plate is used to provide backlight for the opposite-side scanning component.

Preferably, one side of each scanning component facing the scanning channel is provided with a light inlet; one side of the backlight plate facing the scanning channel is provided with a light guide groove corresponding to the light inlet of the corresponding scanning component; and a light source is arranged in the light guide groove.

Preferably, a reflector is also arranged in the light guide groove; the reflector is provided with an arc-shaped reflective surface facing the light inlet; and the light source is configured to face the arc-shaped reflective surface.

Preferably, the arc-shaped reflective surface is located on one side of the reflector, and the light source is located on one side of the reflector close to the arc-shaped reflective surface and installed on the side wall of the light guide groove.

Preferably, an opening of the light guide groove is provided with a baffle plate horizontally extending from the side wall of one side, and the light source is located under the baffle plate.

Preferably, each scanning component is also provided with a light supplement lamp configured to face the backlight plate.

Preferably, the scanning components are provided with two light supplement lamps, and the two light supplement lamps are respectively located on both sides of the light inlet and arranged in sequence in a direction away from the adjacent backlight plate.

Preferably, the light supplement lamps are arranged obliquely, and the distance between the two light supplement lamps is gradually decreased away from the opposite backlight plates.

In the proposed double-sided synchronous scanning device of the present invention, the scanning channel is formed between two scanning components; two backlight plates are respectively used to provide backlight for the opposite-side scanning component and fixed with the same-side scanning component; one side of each backlight plate facing the scanning channel is provided with the light guide groove corresponding to the light inlet of the corresponding scanning component; the backlight source is arranged in the light guide groove. When the two scanning components work synchronously, because the backlight plates always need to provide backlight for the opposite-side scanning component, and the reflected light generated by the backlight plates on the scanning sample enters the light inlet of the same-side scanning component, the image scanning effect is affected. Therefore, by arranging the light guide groove on the backlight plate, the light guide groove limits the emergent light of the backlight light source to a region facing the light inlet of the opposite-side scanning component, so as to avoid the interference of the side overflowed and scattered light of the backlight plate to the same-side scanning component to realize the synchronous high-quality scanning of the two scanning components.

The present invention also proposes a double-sided synchronous scanner, comprising the above double-sided synchronous scanning device.

Preferably, the double-sided synchronous scanner comprises an upper scanning component, an upper backlight plate, a lower scanning component, a lower backlight plate, a housing and a driving mechanism.

An upper slide rail and a lower slide rail arranged in parallel are installed in the housing; the upper scanning component and the lower scanning component can be slidably installed on the upper slide rail and the lower slide rail respectively; the driving mechanism is used to drive the upper scanning component and the lower scanning component to slide synchronously; the upper backlight plate is fixed with the upper scanning component; and the lower backlight plate is fixed with the lower scanning component.

Preferably, the double-sided synchronous scanner further comprises a loading tray that can be placed in the scanning channel; and a transparent loading region is arranged in the middle of the loading tray.

Preferably, the upper side and the lower side of the loading tray are provided with an upper calibration part and a lower calibration part for calibrating the upper scanning component and the lower scanning component respectively, and the upper calibration part and the lower calibration part are located on the same side of the transparent loading region along the extending direction of the upper slide rail.

In the present invention, the technical effect of the proposed double-sided synchronous scanner is similar to that of the above double-sided synchronous scanning device, and will not be repeated.

REFERENCE SIGNS 1. scanning component; 2. backlight plate; 3. light supplement lamp; 9. balance calibration strip; 10. housing; 11. light inlet; 20. upper scanning component; 21. light guide groove; 22. light source; 23. reflector; 24. baffle plate; 30. lower scanning component; 40. upper backlight plate; 50. lower backlight plate; 60. loading tray; 101. upper slide rail; 102. lower slide rail.

DETAILED DESCRIPTION OF THE PRESENT INVENTION

Figure 1:
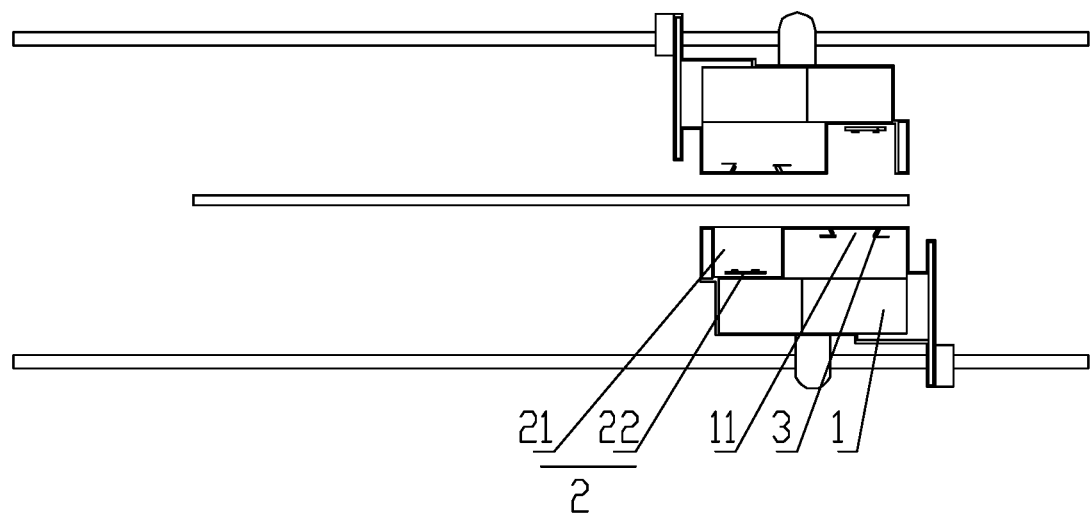
FIG. 1 is a structural schematic diagram of a double-sided synchronous scanning device proposed by the present invention.
Figure 2:
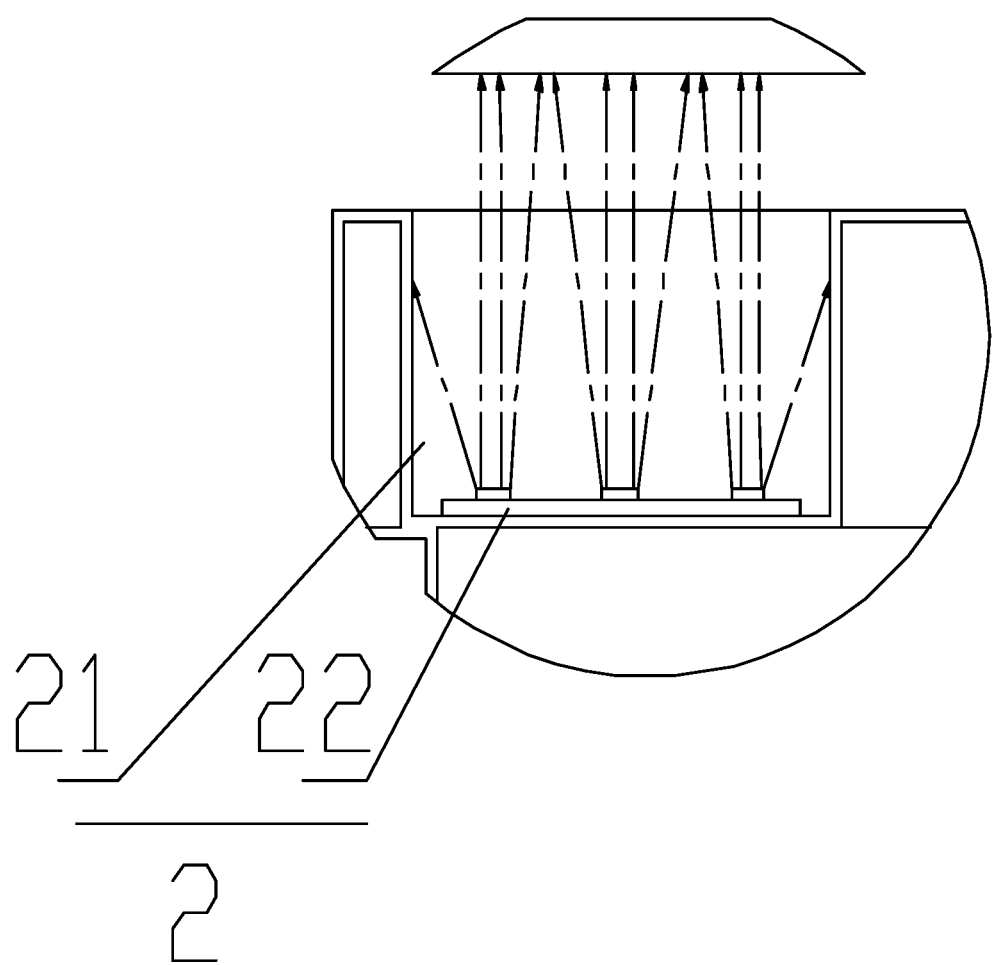
FIG. 2 is a structural schematic diagram of an embodiment of a backlight plate of a double-sided synchronous scanning device proposed by the present invention.
Figure 3:
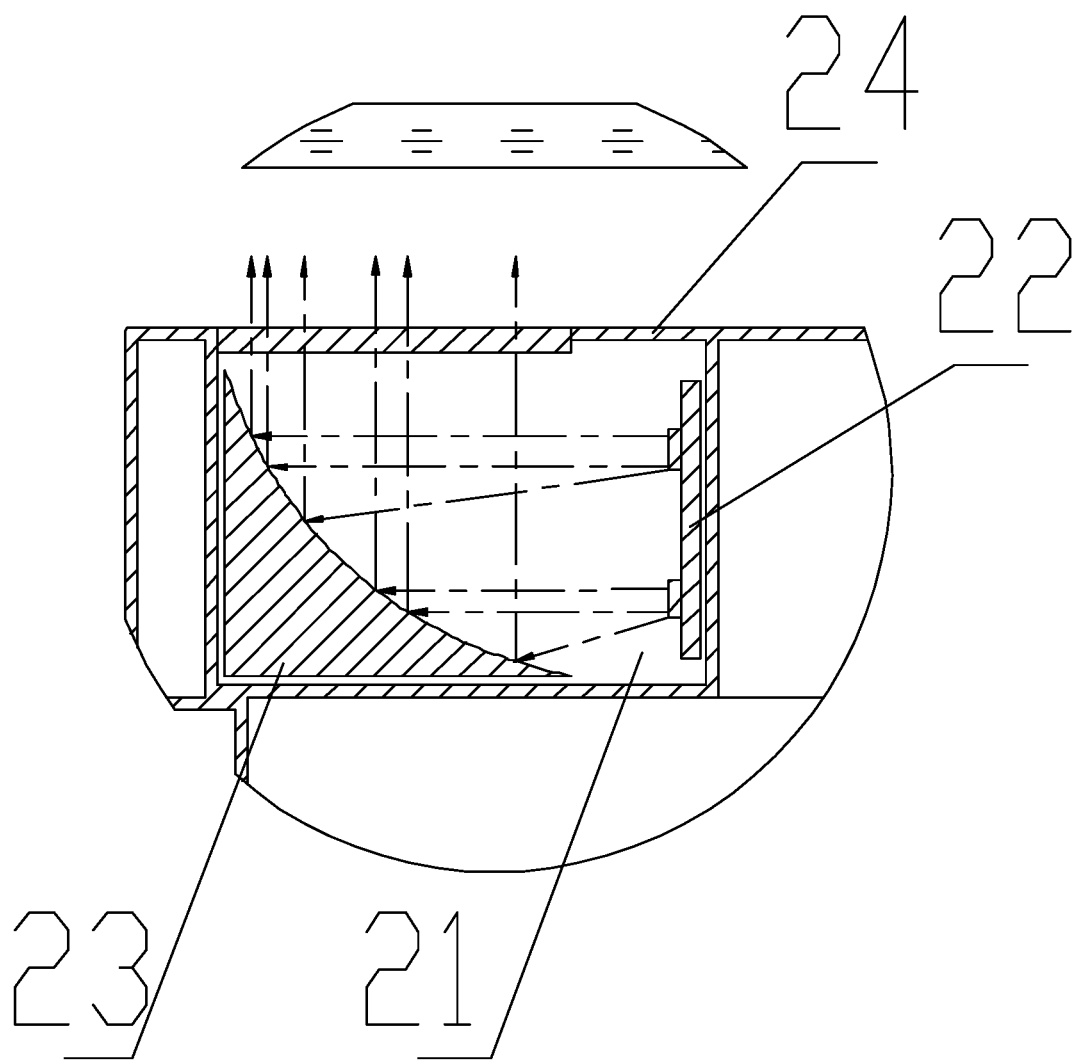
FIG. 3 is a structural schematic diagram of another embodiment of a backlight plate of a double-sided synchronous scanning device proposed by the present invention.
Figure 4:
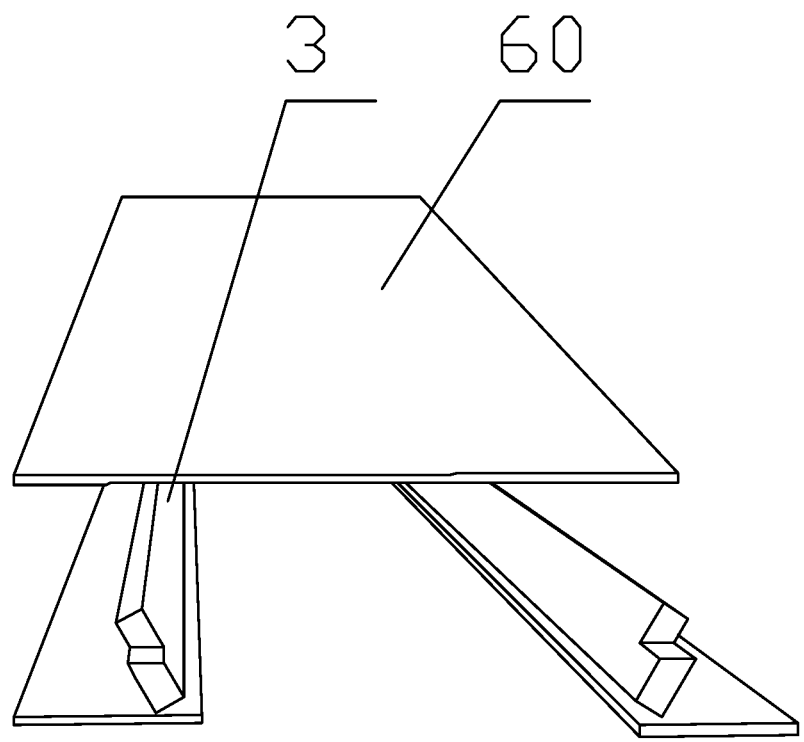
FIG. 4 is a structural schematic diagram of a light supplement lamp of a double-sided synchronous scanning device proposed by the present invention.
Figure 5:
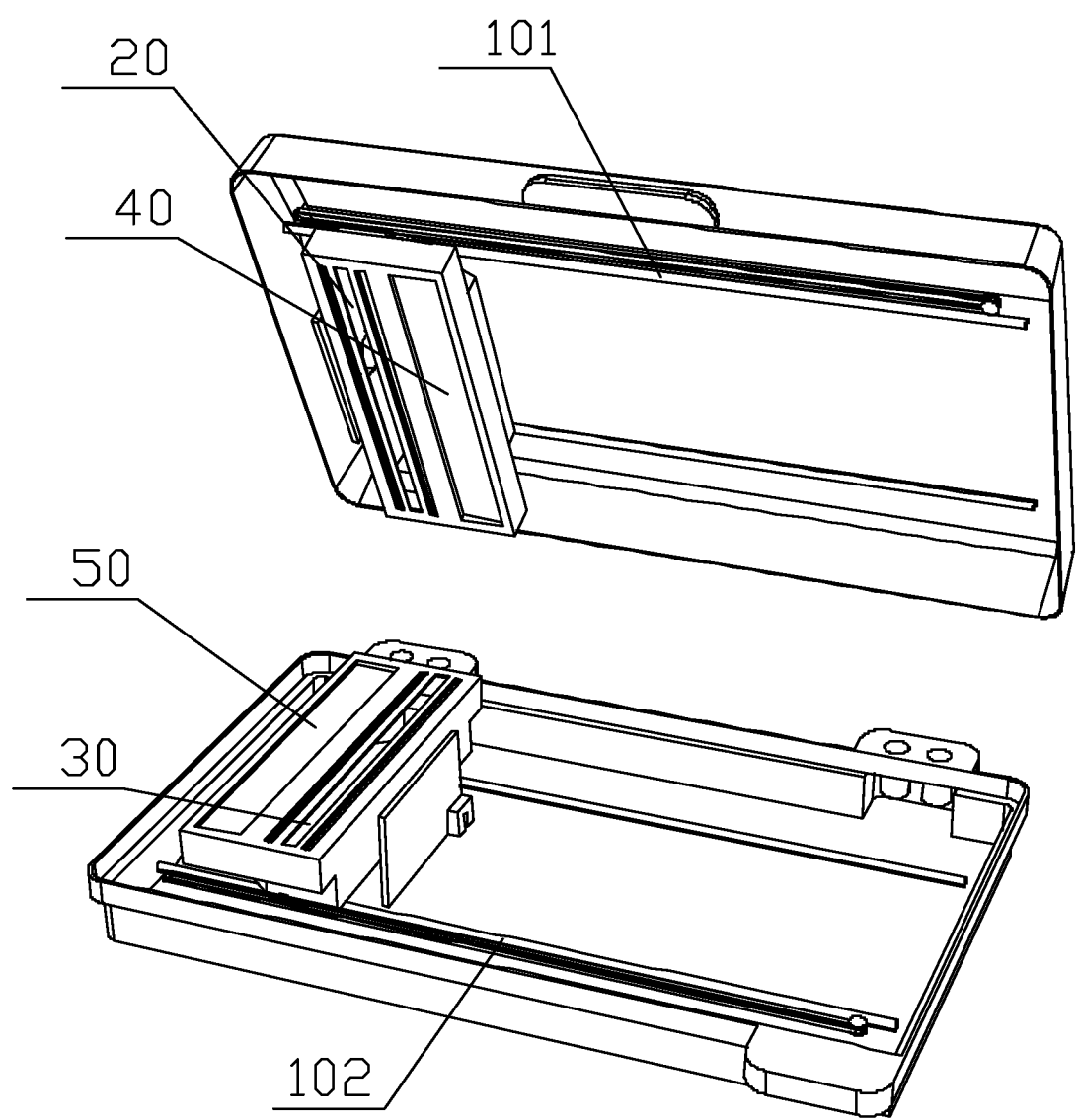
FIG. 5 is a schematic diagram of an installation structure of a double-sided synchronous scanner proposed by the present invention.
Figure 6:
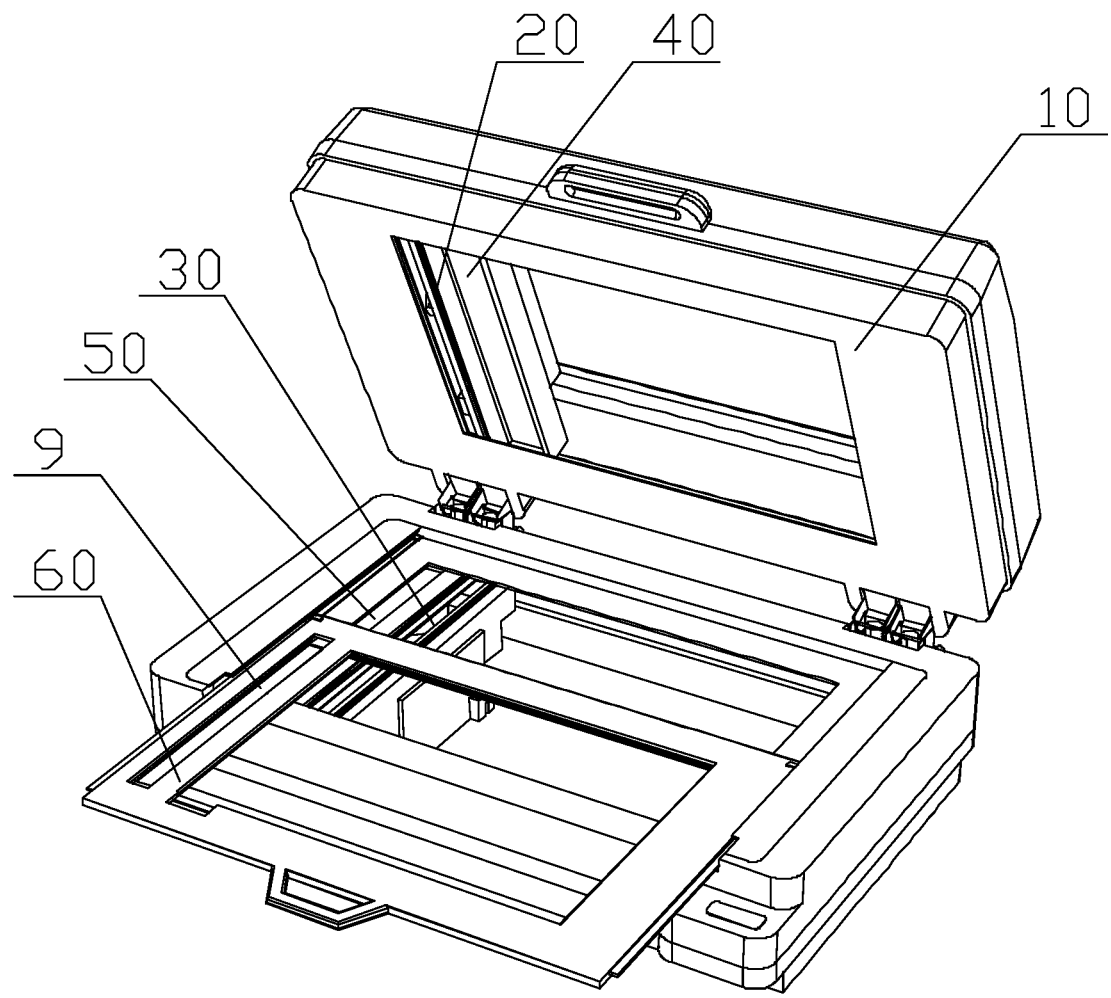
FIG. 6 is an integral structural schematic diagram of a double-sided synchronous scanner proposed by the present invention.

As shown in FIG. 1 to FIG. 6, FIG. 1 is a structural schematic diagram of a double-sided synchronous scanning device proposed by the present invention. FIG. 2 is a structural schematic diagram of an embodiment of a backlight plate of a double-sided synchronous scanning device proposed by the present invention. FIG. 3 is a structural schematic diagram of another embodiment of a backlight plate of a double-sided synchronous scanning device proposed by the present invention. FIG. 4 is a structural schematic diagram of a light supplement lamp of a double-sided synchronous scanning device proposed by the present invention. FIG. 5 is a schematic diagram of an installation structure of a double-sided synchronous scanner proposed by the present invention. FIG. 6 is an integral structural schematic diagram of a double-sided synchronous scanner proposed by the present invention.

In the field of grain particle detection, it is necessary to obtain scanned images of the upper and lower surfaces of grain particles, and place the grain particles to be scanned between the upper and lower scanning components. Due to the needs of detection, a corresponding backlight plate is usually provided for each scanning component. On the one hand, the background of the scanned image is ensured to be uniform and the algorithmic difficulty of subsequent image processing is reduced. On the other hand, the backlight plates supplement the light in the scanning region from the back to improve the image scanning effect.

By referring to FIG. 1 and FIG. 2, a double-sided synchronous scanning device proposed by the present invention comprises two scanning components 1 and two backlight plates 2.

A scanning channel is formed between the two scanning components 1; the two scanning components 1 are staggered; the two backlight plates 2 are respectively located on both sides of the scanning channel and fixed with the same-side scanning component 1; and each backlight plate 2 is used to provide backlight for the opposite-side scanning component 1.

In the specific working process of the double-sided synchronous scanning device in the present embodiment, firstly, the sample is put into a channel which will be scanned; the two backlight plates 2 are respectively located on one side of the sample to be scanned away from the corresponding scanning component 1 as the background of the side of a scanning region; and the scanning region is formed between each scanning component 1 and the corresponding backlight plate 2. During scanning, in order to reduce the arrangement of the driving mechanism and increase the scanning efficiency, the two scanning components 1 and the corresponding backlight plates 2 can be moved synchronously, so that the two scanning regions sequentially pass through the sample surface to obtain an upper scanning image and a lower scanning image.

Further, in the process of driving the upper scanning component and the lower scanning component to move synchronously, their corresponding backlight plates will move synchronously too. While the backlight plates provide backlight for the relative scanning components, the light emitted by the backlight plates is reflected by the grain particles and affects the image obtained by the same-side scanning component, resulting in inconsistent image background after scanning, furthermore, affecting the scanning quality and increasing the difficulty of algorithm processing. Therefore, in actual use, the images obtained by the synchronous scanning during the synchronous movement of the upper scanning component and the lower scanning component brings great difficulties to the subsequent image processing.

In order to solve the above problems, in the specific design mode, one side of each scanning component 1 facing the scanning channel is provided with a light inlet 11; one side of the backlight plate 2 facing the scanning channel is provided with a light guide groove 21 corresponding to the light inlet 11 of the corresponding scanning component 1; and a light source 22 is arranged in the light guide groove 21.

In the scanning process, since the backlight source 22 is located in the light guide groove 21, the edge of the light guide groove 21 blocks the scattered light emitted by the light source 22 at the outer periphery of the light, so that a light beam emitted from the light guide groove 21 is focused on the light inlet 11 of the scanning component 1. Further, when the two groups of backlight plates 2 move and scan synchronously with the scanning component 1, the interference of the scattered light on the same-side scanning component 1 is avoided, and the quality of the scanned images is ensured while the scanning efficiency is increased.

In the present embodiment, for the proposed double-sided synchronous scanning device, the scanning channel is formed between two scanning components 1; two backlight plates 2 are respectively used to provide backlight for the opposite-side scanning component 1 and fixed with the same-side scanning component 1; one side of each backlight plate 2 facing the scanning channel is provided with the light guide groove 21 corresponding to the light inlet of the corresponding scanning component 1; the backlight source 22 is arranged in the light guide groove 21; When the two scanning components 1 work synchronously, because the backlight plates 2 always need to provide backlight for the opposite-side scanning component 1, and the reflected light generated by the backlight plates 2 on a scanned sample enters the light inlet 11 of the same-side scanning component 1, which will affect the image scanning effect. Therefore, by arranging the light guide groove 21 on the backlight plate 2, the light guide groove 21 limits the emergent light of the backlight light source 22 to a region facing the light inlet 11 of the opposite-side scanning component 1, so as to avoid the interference of the side overflowed and scattered light of the backlight plate 2 to the same-side scanning component 1 to realize the synchronous high-quality scanning of the two scanning components 1.

By referring to FIG. 3, because the light emitted by the light source 22 has multiple directions, there is still a certain amount of scattered light after exiting from the light guide groove 21. While interference is brought to the adjacent scanning components 1, the light intensity irradiated on the scanning region is uneven, thereby affecting the scanning effect. Therefore, in a further specific design mode, a reflector 23 is also arranged in the light guide groove 21; the reflector 23 is provided with an arc-shaped reflective surface facing the light inlet 11; and the light source 22 is configured to face the arc-shaped reflective surface. In the working process of the backlight plates, the light emitted by the light source 22 firstly passes through the arc-shaped reflective surface of the reflector 23, and the light beams entering at different incident angles are reflected by the arc-shaped reflective surface to form parallel light beams, and then the light beams are limited by an outlet of the light guide groove 21 to form parallel light beams toward the light inlet 11, to ensure the backlight effect of the scanning components 1 and avoid the light interference to the same-side scanning component 1.

In a specific arrangement mode of the light source 22 and the reflector 23 in the light guide groove 21, the arc-shaped reflective surface is located on one side of the reflector 23, and the light source 22 is located on one side of the reflector 23 close to the arc-shaped reflective surface and installed on the side wall of the light guide groove 21. While the space utilization rate in the light guide groove 21 is increased, the light emitted by the light source is reflected from the arc-shaped reflective surface and then emitted from the light guide groove 21 to prevent the scattered light from being emitted to the light guide groove 21.

In a further specific design mode, an opening of the light guide groove 21 is provided with a baffle plate 24 horizontally extending from the side wall of one side, and the light source 22 is located under the baffle plate 24. The baffle plate 24 shields the light source 22 from above to further prevent the scattered light of the light source 22 from being emitted from the light guide groove 21.

In the scanning process of grain particles, in order to ensure the front scanning effect, in another specific design mode of the scanning components 1, each scanning component 1 is also provided with a light supplement lamp 3 configured to face the backlight plate 2. When scanning, the light supplement lamp 3 is used to supplement the light for the front surface of the scanning region to ensure the image scanning quality.

Because the scanning components 1 adopt a mobile scanning working mode and the scanning region is also relatively translational, in order to supplement the light for the scanning region in real time, in the specific design mode of the light supplement lamps 3, the scanning components 1 are provided with two light supplement lamps 3. The two light supplement lamps 3 are respectively located on both sides of the light inlet 11 and arranged in sequence in a direction away from the adjacent backlight plate 2. The two light supplement lamps supplement the light for the scanning region from both sides of the light inlet.

By referring to FIG. 4, in the specific design mode of the light supplement lamps 3, the light supplement lamps 3 are arranged obliquely, and the distance between the two light supplement lamps 3 is gradually decreased away from the opposite backlight plates 2. The light supplement lamps 3 are arranged obliquely so that the emergent light of the two light supplement lamps 3 faces the scanning region to prevent the interference of the scattered light to the backlight regions of the adjacent backlight plates.

By referring to FIG. 5 and FIG. 6, in another embodiment, the present invention also proposes a double-sided synchronous scanner, comprising the above double-sided synchronous scanning device and specifically comprising: an upper scanning component 20, an upper backlight plate 40, a lower scanning component 30, a lower backlight plate 50, a housing 10 and a driving mechanism.

An upper slide rail 101 and a lower slide rail 102 arranged in parallel are installed in the housing 10; the upper scanning component 20 and the lower scanning component 30 can be slidably installed on the upper slide rail 101 and the lower slide rail 102 respectively; the driving mechanism is used to drive the upper scanning component 20 and the lower scanning component 30 to slide synchronously; the upper backlight plate 40 is fixed with the upper scanning component 20; and the lower backlight plate 50 is fixed with the lower scanning component 30.

In the specific design of the housing 10, in order to facilitate the installation of the scanning components and the backlight plates, the housing can be configured as upper-lower housing structure.

In the specific working process of the double-sided synchronous scanner of the present embodiment, firstly, the sample is put into a channel which will be scanned; the upper scanning component 20 and the upper backlight plate 40 are located on one side of the sample to be scanned; the lower backlight plate 50 and the lower scanning component 30 are located on the other side of the sample to be scanned; the upper scanning component 20 scans the upper surface of the sample; and the lower backlight plate 50 serves as the background of the upper scanned image. Similarly, the lower scanning component 30 scans the lower surface of the sample, and the upper backlight plate 40 serves as the background of the lower scanned image. During scanning, the driving mechanism drives the upper scanning component 20 and the lower scanning component 30 to slide synchronously along the upper slide rail and the lower slide rail. Meanwhile, the upper scanning component 20 cooperates with the lower backlight plate 50 to scan the upper surface image of the sample, and the lower scanning component 30 cooperates with the upper backlight plate 40 to scan the lower surface image of the sample, thereby synchronously scanning the images on both sides of the sample.

For the convenience of putting in and taking out the sample to be scanned, the double-sided synchronous scanner of the present embodiment further comprises a loading tray 60 that can be placed in the scanning channel; and a transparent loading region is arranged in the middle of the loading tray 60.

In order to facilitate the subsequent processing of the upper and the lower images, the upper and the lower scanning components need to be calibrated before scanning. Generally, a balance calibration strip initialized by the scanner is directly arranged on the scanner housing on the opposite side, which causes relatively large thickness of the scanner, reduces the placement space of the loading tray and further limits the size range of the detectable sample. Therefore, in the specific design mode of the loading tray, the upper side and the lower side of the loading tray 60 are provided with an upper calibration part and a lower calibration part for calibrating the upper scanning component 20 and the lower scanning component 30 respectively, and the upper calibration part and the lower calibration part are located on the same side of the transparent loading region along the extending direction of the upper slide rail 101. Before scanning, the upper scanning component 20 and the lower scanning component 30 are initially located on one side of the transparent loading region near the upper calibration part and the lower calibration part. The upper calibration part and the lower calibration part are used to initialize the color balance of the upper and the lower scanning components respectively, and then the upper and the lower surface images of grain particles are obtained through the upper and the lower scanning components.

In the specific arrangement mode of the scanning calibration region, the present embodiment also comprises the balance calibration strip 9. The loading tray 60 has a first installation opening and a second installation opening; a transparent support plate is arranged at the first installation opening; the transparent support plate forms the transparent loading region at the first installation opening; the second installation opening is located on one side of the first installation opening along the extension direction of the upper and the lower slide rails; and the balance calibration strip 9 is installed at the second installation opening. By arranging the balance calibration strip 9, both sides of the balance calibration strip are used as the initialization calibration regions of the double-sided scanner to play a role in positioning and color balance, so as to achieve the initialization calibration of the double-sided scanner and provide convenience for the arrangement of two initialization calibration regions. Preferably, the balance calibration strip can be a white balance calibration strip.

The above are only the preferred specific embodiments of the present invention, but the protection scope of the present invention is not limited thereto. Any equivalent replacements or changes made according to the technical solutions and inventive concept of the present invention by those skilled in the art familiar with the technical field within the technical scope disclosed by the present invention shall be covered by the protection scope of the present invention.

What is claimed is:

1. A double-sided synchronous scanning device, comprising: two scanning components and two backlight plates; a scanning channel is formed between the two scanning components; the two scanning components are staggered; the two backlight plates are respectively located on both sides of the scanning channel and fixedly arranged with the same-side scanning component; each backlight plate is arranged right opposite to the opposite-side scanning component and each backlight plate is used to provide backlight for the opposite-side scanning component.

2. The double-sided synchronous scanning device according to claim 1, wherein one side of each scanning component facing the scanning channel is provided with a light inlet; one side of the backlight plate facing the scanning channel is provided with a light guide groove corresponding to the light inlet of the corresponding scanning component; and a light source is arranged in the light guide groove.

3. The double-sided synchronous scanning device according to claim 2, wherein each scanning component is also provided with a light supplement lamp configured to face the backlight plate.

4. The double-sided synchronous scanning device according to claim 3, wherein the scanning components are provided with two light supplement lamps, and the two light supplement lamps are respectively located on both sides of the light inlet and arranged in sequence in a direction away from the adjacent backlight plate.

5. The double-sided synchronous scanning device according to claim 4, wherein the light supplement lamps are arranged obliquely, and the distance between the two light supplement lamps is gradually decreased away from the opposite backlight plates.

6. A double-sided synchronous scanner, comprising the double-sided synchronous scanning device of claim 3,
preferably comprising an upper scanning component, an upper backlight plate, a lower scanning component, a lower backlight plate, a housing and a driving mechanism,
wherein an upper slide rail and a lower slide rail arranged in parallel are installed in the housing; the upper scanning component and the lower scanning component can be slidably installed on the upper slide rail and the lower slide rail respectively; the driving mechanism is used to drive the upper scanning component and the lower scanning component to slide synchronously; the upper backlight plate is fixed with the upper scanning component; and the lower backlight plate is fixed with the lower scanning component.

7. The double-sided synchronous scanner according to claim 6, further comprising a loading tray that can be placed in the scanning channel; and a transparent loading region is arranged in the middle of the loading tray;
the upper side and the lower side of the loading tray are provided with an upper calibration part and a lower calibration part for calibrating the upper scanning component and the lower scanning component respectively, and the upper calibration part and the lower calibration part are located on the same side of the transparent loading region along the extending direction of the upper slide rail.

8. The double-sided synchronous scanning device according to claim 2, wherein a reflector is also arranged in the light guide groove; the reflector is provided with an arc-shaped reflective surface facing the light inlet; and the light source is configured to face the arc-shaped reflective surface.

9. A double-sided synchronous scanner, comprising the double-sided synchronous scanning device of claim 8,
comprising an upper scanning component, an upper backlight plate, a lower scanning component, a lower backlight plate, a housing and a driving mechanism,
wherein an upper slide rail and a lower slide rail arranged in parallel are installed in the housing; the upper scanning component and the lower scanning component can be slidably installed on the upper slide rail and the lower slide rail respectively; the driving mechanism is used to drive the upper scanning component and the lower scanning component to slide synchronously; the upper backlight plate is fixed with the upper scanning component; and the lower backlight plate is fixed with the lower scanning component.

10. The double-sided synchronous scanner according to claim 9, further comprising a loading tray that can be placed in the scanning channel; and a transparent loading region is arranged in the middle of the loading tray;

the upper side and the lower side of the loading tray are provided with an upper calibration part and a lower calibration part for calibrating the upper scanning component and the lower scanning component respectively, and the upper calibration part and the lower calibration part are located on the same side of the transparent loading region along the extending direction of the upper slide rail.

11. The double-sided synchronous scanning device according to claim 8, wherein the arc-shaped reflective surface is located on one side of the reflector, and the light source is located on one side of the reflector close to the arc-shaped reflective surface and installed on the side wall of the light guide groove.

12. A double-sided synchronous scanner, comprising the double-sided synchronous scanning device of claim 11, comprising an upper scanning component, an upper backlight plate, a lower scanning component, a lower backlight plate, a housing and a driving mechanism, wherein an upper slide rail and a lower slide rail arranged in parallel are installed in the housing; the upper scanning component and the lower scanning component can be slidably installed on the upper slide rail and the lower slide rail respectively; the driving mechanism is used to drive the upper scanning component and the lower scanning component to slide synchronously; the upper backlight plate is fixed with the upper scanning component; and the lower backlight plate is fixed with the lower scanning component.

13. The double-sided synchronous scanner according to claim 12, further comprising a loading tray that can be placed in the scanning channel; and a transparent loading region is arranged in the middle of the loading tray;

the upper side and the lower side of the loading tray are provided with an upper calibration part and a lower calibration part for calibrating the upper scanning component and the lower scanning component respectively, and the upper calibration part and the lower calibration part are located on the same side of the transparent loading region along the extending direction of the upper slide rail.

14. The double-sided synchronous scanning device according to claim 11, wherein an opening of the light guide groove is provided with a baffle plate horizontally extending from the side wall of one side, and the light source is located under the baffle plate.

15. A double-sided synchronous scanner, comprising the double-sided synchronous scanning device of claim 14, comprising an upper scanning component, an upper backlight plate, a lower scanning component, a lower backlight plate, a housing and a driving mechanism, wherein an upper slide rail and a lower slide rail arranged in parallel are installed in the housing; the upper scanning component and the lower scanning component can be slidably installed on the upper slide rail and the lower slide rail respectively; the driving mechanism is used to drive the upper scanning component and the lower scanning component to slide synchronously; the upper backlight plate is fixed with the upper scanning component; and the lower backlight plate is fixed with the lower scanning component.

16. The double-sided synchronous scanner according to claim 15, further comprising a loading tray that can be placed in the scanning channel; and a transparent loading region is arranged in the middle of the loading tray;

the upper side and the lower side of the loading tray are provided with an upper calibration part and a lower calibration part for calibrating the upper scanning component and the lower scanning component respectively, and the upper calibration part and the lower calibration part are located on the same side of the transparent loading region along the extending direction of the upper slide.

17. A double-sided synchronous scanner, comprising the double-sided synchronous scanning device of claim 2, comprising an upper scanning component, an upper backlight plate, a lower scanning component, a lower backlight plate, a housing and a driving mechanism, wherein an upper slide rail and a lower slide rail arranged in parallel are installed in the housing; the upper scanning component and the lower scanning component can be slidably installed on the upper slide rail and the lower slide rail respectively; the driving mechanism is used to drive the upper scanning component and the lower scanning component to slide synchronously; the upper backlight plate is fixed with the upper scanning component; and the lower backlight plate is fixed with the lower scanning component.

18. The double-sided synchronous scanner according to claim 17, further comprising a loading tray that can be placed in the scanning channel; and a transparent loading region is arranged in the middle of the loading tray;

the upper side and the lower side of the loading tray are provided with an upper calibration part and a lower calibration part for calibrating the upper scanning component and the lower scanning component respectively, and the upper calibration part and the lower calibration part are located on the same side of the transparent loading region along the extending direction of the upper slide rail.

19. A double-sided synchronous scanner, comprising the double-sided synchronous scanning device of claim 1, comprising an upper scanning component, an upper backlight plate, a lower scanning component, a lower backlight plate, a housing and a driving mechanism, wherein an upper slide rail and a lower slide rail arranged in parallel are installed in the housing; the upper scanning component and the lower scanning component can be slidably installed on the upper slide rail and the lower slide rail respectively; the driving mechanism is used to drive the upper scanning component and the lower scanning component to slide synchronously; the upper backlight plate is fixed with the upper scanning component; and the lower backlight plate is fixed with the lower scanning component.

20. The double-sided synchronous scanner according to claim 19, further comprising a loading tray that can be placed in the scanning channel; and a transparent loading region is arranged in the middle of the loading tray;

preferably, the upper side and the lower side of the loading tray are provided with an upper calibration part and a lower calibration part for calibrating the upper scanning component and the lower scanning component respectively, and the upper calibration part and the lower calibration part are located on the same side of the transparent loading region along the extending direction of the upper slide rail.

* * * * *